United States Patent
Beauregard

(10) Patent No.: US 10,351,001 B2
(45) Date of Patent: Jul. 16, 2019

(54) TRIM ASSEMBLY COMPRISING A DISPLAY DEVICE AND VEHICLE COMPRISING SUCH TRIM ASSEMBLY

(71) Applicant: Faurecia Interieur Industrie, Nanterre (FR)

(72) Inventor: Julien Beauregard, Mesnil en Thelle (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 15/582,292

(22) Filed: Apr. 28, 2017

(65) Prior Publication Data
US 2017/0313191 A1   Nov. 2, 2017

(30) Foreign Application Priority Data
Apr. 28, 2016   (FR) ...................... 16 53803

(51) Int. Cl.
*B60K 35/00* (2006.01)
*B60K 37/02* (2006.01)
(Continued)

(52) U.S. Cl.
CPC .............. *B60K 37/02* (2013.01); *B60K 35/00* (2013.01); *B60K 37/04* (2013.01);
(Continued)

(58) Field of Classification Search
CPC ........ B60K 2350/405; B60K 2350/406; B60K 2350/1028; B60K 2350/106; B60K 2350/941; B60K 37/02; B60K 37/04; B60K 35/00; B60R 11/0229; B60R 11/0235; B60R 11/0258; B60R 13/0256;
(Continued)

(56) References Cited

U.S. PATENT DOCUMENTS 7,239,101 B2 * 7/2007 Choi ...................... B60K 35/00
248/125.2
8,072,743 B2 * 12/2011 Kissel ................. B60R 11/0235
224/483
(Continued)

FOREIGN PATENT DOCUMENTS

DE   202015103992 U1   10/2015
FR       2807978 A1   10/2001
WO   WO2006029804 A1    3/2006

OTHER PUBLICATIONS

French Search Report in French for application No. FR1653803, dated Jan. 11, 2017, 2 pages.

*Primary Examiner* — Laura Freedman
(74) *Attorney, Agent, or Firm* — Reising Ethington P.C.

(57) ABSTRACT

A vehicle trim assembly that includes a trim and a display device having a display screen with a first display zone and a second display zone. The display device is movable relative to the trim between a first stable position, in which the first display zone is visible and the second display zone is hidden by the trim, and a second stable position, in which the first display zone and the second display zone are both visible. The second stable position is offset relative to the first stable position along a first direction perpendicular to the display screen in the first position, in the direction toward which the display screen is facing.

11 Claims, 4 Drawing Sheets

(51) Int. Cl.
*B60K 37/04* (2006.01)
*B60R 11/02* (2006.01)
*B60R 13/02* (2006.01)
*B60R 11/00* (2006.01)

(52) U.S. Cl.
CPC ...... *B60R 11/0235* (2013.01); *B60R 13/0256* (2013.01); *B60K 2350/106* (2013.01); *B60K 2350/1028* (2013.01); *B60K 2350/405* (2013.01); *B60K 2350/406* (2013.01); *B60K 2350/941* (2013.01); *B60R 2011/0005* (2013.01); *B60R 2011/0082* (2013.01); *B60R 2011/0092* (2013.01); *B60R 2013/0287* (2013.01)

(58) Field of Classification Search
CPC ..... B60R 2013/0287; B60R 2011/0005; B60R 2011/0084; B60R 2011/0085; B60R 2011/0092; B60R 2011/0082
See application file for complete search history.

(56) References Cited

U.S. PATENT DOCUMENTS

| | | | |
|---|---|---|---|
| 9,070,209 B2* | 6/2015 | Ng | G06T 13/00 |
| 9,332,207 B2* | 5/2016 | Nakayama | H04N 5/64 |
| 9,517,733 B2* | 12/2016 | Wall | B60K 35/00 |
| 9,690,729 B2* | 6/2017 | Jolda | G06F 13/36 |
| 9,731,602 B2* | 8/2017 | Kim | G06F 1/1601 |
| 9,862,402 B2* | 1/2018 | Earl | B62D 25/145 |
| 2003/0128103 A1* | 7/2003 | Fitzpatrick | B60K 35/00 340/425.5 |
| 2009/0066474 A1 | 3/2009 | Kawachi et al. | |
| 2009/0128307 A1 | 5/2009 | Hentsch et al. | |

\* cited by examiner

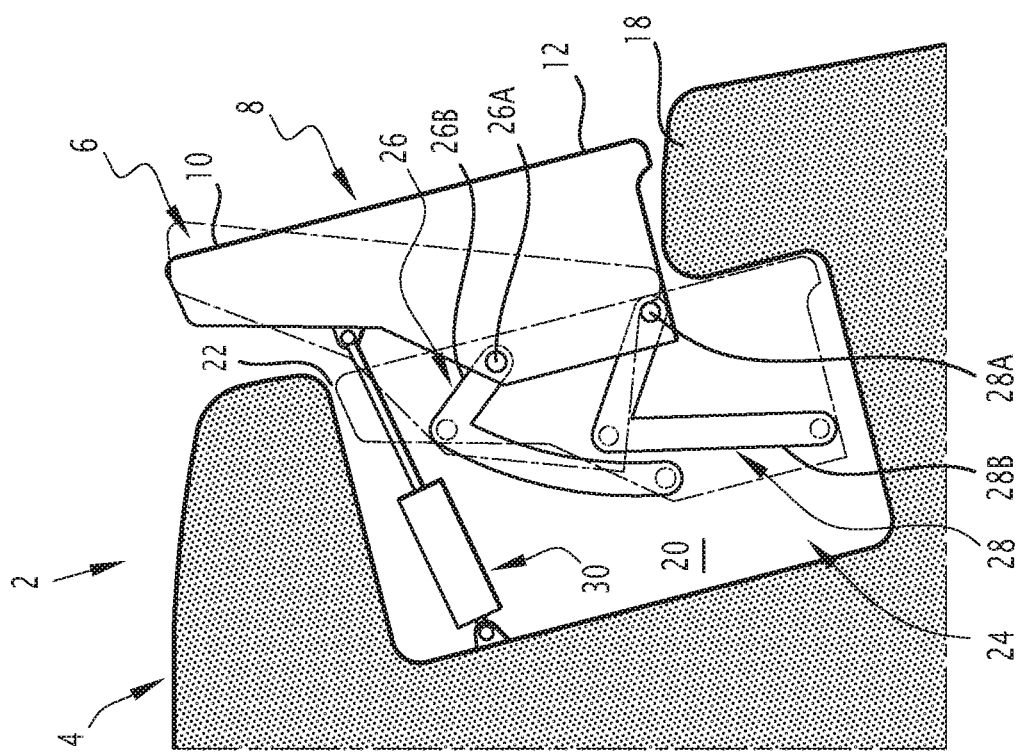

TRIM ASSEMBLY COMPRISING A DISPLAY DEVICE AND VEHICLE COMPRISING SUCH TRIM ASSEMBLY

TECHNICAL FIELD

The present invention relates to a vehicle trim assembly, in particular for a motor vehicle, the trim assembly comprising a display device.

BACKGROUND

Most motor vehicles are now provided with a display device for example making it possible to display information about functions of the vehicle, as well as to control functions of the vehicle, if the display device is provided with a touch-sensitive display screen.

FR 2,807,978 A1 discloses a motor vehicle dashboard provided with a display device vertically movable between a first stable position, in which the display device is partially retracted in a housing, and a second stable position, in which the display device is deployed outside the housing, only a first display zone being visible in the first position, the first display zone and a second display zone being visible in the second position.

US 2009/0066474 A1 discloses a motor vehicle dashboard provided with a display device longitudinally movable between a first position, in which the display device is remote from an operator, and a second position, in which the display device is close to an operator.

SUMMARY

One of the aims of the invention is to propose a vehicle trim assembly comprising a display device, the trim assembly being aesthetically pleasing and ergonomic.

To that end, according to a first aspect, the invention proposes a vehicle trim assembly comprising a trim and a display device having a display screen with a first display zone and a second display zone, the display device being movable relative to the trim between a first stable position, in which the first display zone is visible and the second display zone is hidden by the trim, and a second stable position, in which the first display zone and the second display zone are both visible, wherein the second stable position is offset relative to the first stable position along a first direction perpendicular to the display screen in the first position, in the direction toward which the display screen is facing.

The trim assembly may further include one or more of the features below, considered individually or according to any technical possible combination(s):
- in the first stable position, the display screen is flush with a visible surface of the trim panel, and in the second stable position, the display screen protrudes relative to the visible surface;
- the visible surface comprises two regions situated on either side of the display screen;
- the second position is furthermore offset relative to the first position along a second direction perpendicular to the first direction;
- the trim comprises a housing, the display device being received in the housing in the first position, and situated outside the housing in the second position;
- the housing has an opening, the first display zone coinciding with the opening and being visible through the opening when the trim device is in the first position;
- the opening has dimensions smaller than those of the display screen, the display device traversing the opening to go from the first position to the second position;
- the display device is mounted on the trim to move from the first position toward the second position by pivoting such that the display screen is inclined relative to the opening, passing through the opening, then pivoting to straighten the display screen at least partially;
- the trim comprises an immobile concealing part hiding the second display zone in the first position of the display device, the display device moving between the first position and the second position so as to bypass said concealing part; and
- the trim is a dashboard.

According to a second aspect, the invention relates to a vehicle comprising a trim assembly having the above features.

BRIEF DESCRIPTION OF THE DRAWINGS

The invention and its advantages will be better understood upon reading the following description, provided solely as an example, and done in reference to the appended drawings, in which:

FIG. 6 is a schematic sectional view illustrating a movement mechanism configured to move the display device.

DETAILED DESCRIPTION OF THE ILLUSTRATED EMBODIMENT

Figure 1:
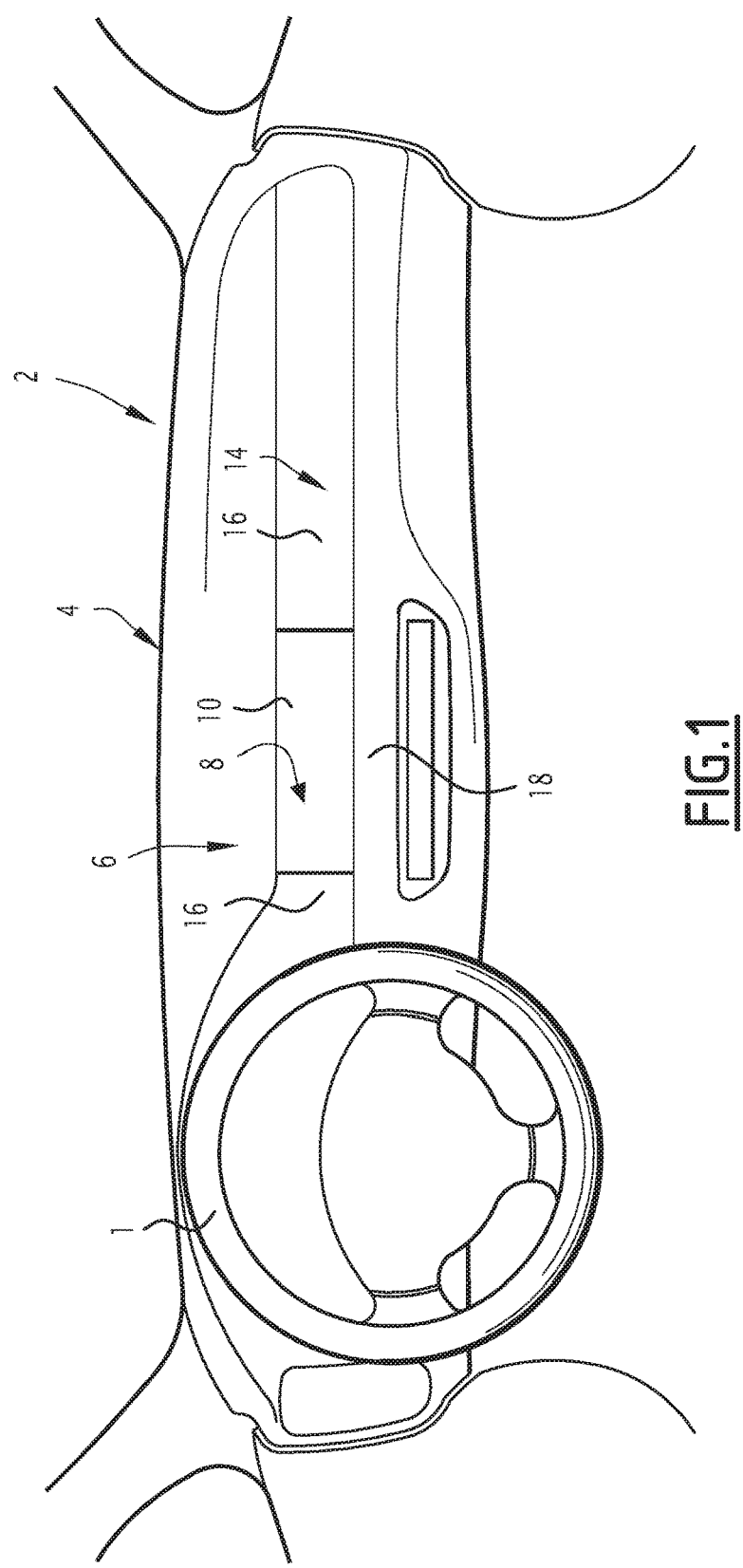
FIGS. 1 and 2 are schematic views of a motor vehicle trim assembly comprising a movable display device, the display device being shown in a first stable position and a second stable position in FIG. 1 and FIG. 2, respectively.
Figure 2:
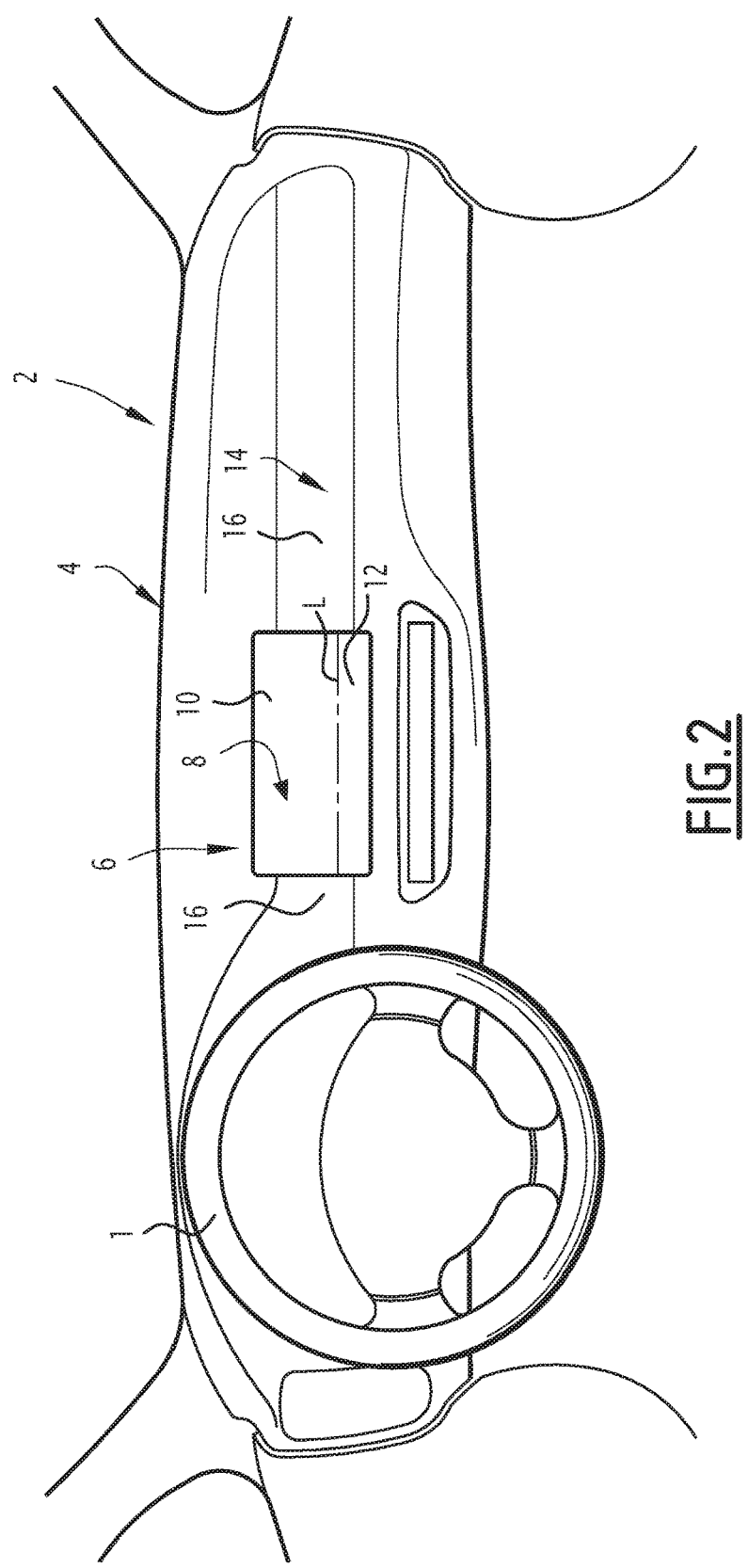

FIGS. 1 and 2 illustrate a front part of the passenger compartment of a motor vehicle provided with a steering wheel 1 to steer the vehicle and a trim assembly 2 comprising a dashboard 4 and a display device 6 integrated into the dashboard 4.

In the rest of the description, the terms "front", "rear", "top" and "bottom", "left" and "right", "longitudinal", "transverse" and "vertical" should be understood in reference to the typical orientations of vehicles.

The dashboard 4 extends substantially horizontally and transversely over the width of the front part of the passenger compartment. The display device 6 is positioned on the dashboard 4 substantially in the middle along the transverse direction of the motor vehicle.

The display device 6 comprises a display screen 8. The display screen 8 is configured to generate images. The display screen 8 is a light-emitting screen, for example a light-emitting diode screen (LED or TFT). The display screen 8 comprises a matrix of pixels.

Preferably, the display screen 8 is a touch-sensitive screen. The display screen 8 allows the user to interact with the display device 6 by touching the display screen 8, for example to control functions of the vehicle via the display screen 8. Thus, the display screen 8 forms a man-machine interface.

The display screen 8 has a first display zone 10 (FIGS. 1 and 2) and a second display zone 12 (FIG. 2).

The first display zone 10 and the second display zone 12 are two separate zones of the same display screen 8. This therefore involves two regions of a same continuous image display surface defined by the display screen 8.

The display screen 8 is flat. The first display zone 10 and the second display zone 12 are coplanar.

The first display zone 10 and the second display zone 12 are each a pixel sub-matrix of the pixel matrix of the display screen 8.

The first display zone 10 and the second display zone 12 are separate from one another. The sub-matrix defining the first display zone 10 and the sub-matrix defining the second display zone 12 are separate.

In the illustrated example, the first display zone 10 here is situated above the second display zone 12 on the display screen 8. The first display zone 10 and the second display zone 12 are separated by a separating line L. The separating line L is substantially horizontal.

The display device 6 is mounted movably relative to the dashboard 2 between a first stable position (FIG. 1), in which only the first display zone 10 is visible by a user, the second display zone 12 being hidden by the dashboard 4, and a second stable position (FIG. 2), in which the first display zone 10 and the second display zone 12 are both visible by a user. The user is in particular the driver of the vehicle.

Figure 5:
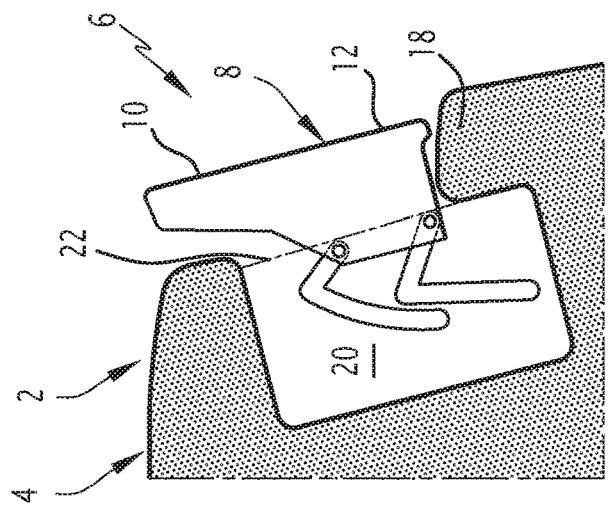
FIGS. 3 to 5 are sectional schematic views of the trim assembly, illustrating the display device in the first stable position, an intermediate position and the second stable position, respectively.
Figure 4:
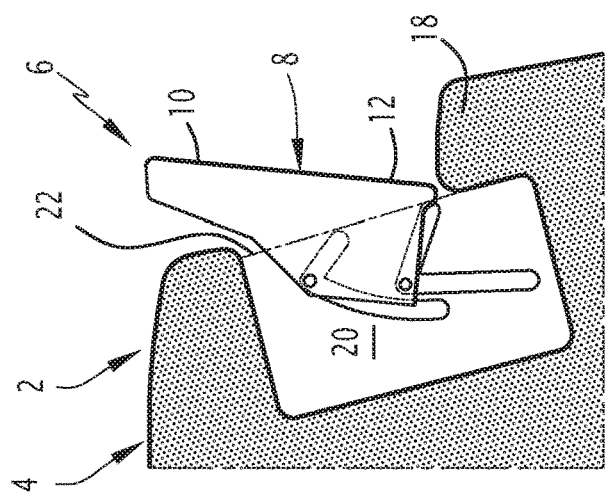
Figure 3:
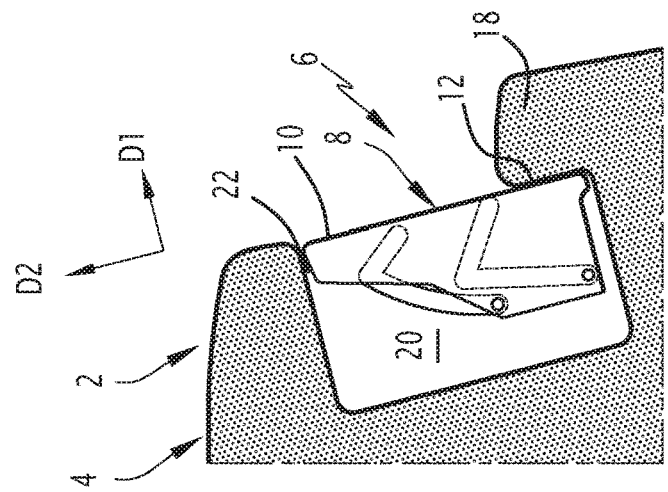

FIGS. 3 to 5 show the display device in the first stable position, an intermediate position and the second stable position, respectively.

In the first stable position (FIG. 3), the display screen 8 is substantially perpendicular to a first direction D1. The first direction D1 is the normal to the display screen 8. The display screen 8 faces a user, for example the driver.

The second stable position (FIG. 5) is offset relative to the first stable position along the first direction D1, in the direction toward which the display screen 8 faces. Thus, in the second stable position, the display screen 8 is closer to the user relative to the first stable position.

As illustrated, in the first stable position of the display device 6, the display screen 8 is slightly inclined forward relative to the vertical. The display screen 8 is therefore turned toward the rear and upward. The first direction D1 is slightly inclined relative to the horizontal.

In the illustrated embodiment, the second stable position is also offset relative to the first stable position along a second direction D2 perpendicular to the first direction D1.

The second direction D2 here extends substantially parallel to the display screen 8, from a lower edge toward an upper edge of the display screen 8.

The second direction D2 is slightly inclined relative to the vertical. Between the first position and the second position, the display device 6 is offset vertically upward. Thus, in the second position, the display screen 8 is higher than in the first position.

Returning to FIGS. 1 and 2, in the first position, the display device 6 is retracted at least partially into the dashboard 4, and in the second position, the display device 6 is deployed outside the dashboard 4.

In the first position of the display device 6, the display screen 8 is flush with a visible surface 14 of the dashboard 4, and in the second position, the display screen 8 protrudes relative to the visible surface 14.

In the first position of the display device 6, the screen 8 and the adjacent visible surface 14 extend one another with no noticeable discontinuity. The display screen 8 and the visible surface 14 visually provide surface continuity, which is favorable to the aesthetic appearance.

In the second position of the display device 6, the display screen 8 is positioned protruding relative to the visible surface 14 in a more ergonomic position for the user, while in particular being closer to the user.

The visible surface 14 here comprises two regions 16 situated laterally on either side of the display screen 8. The two lateral regions 16 frame the display screen 8. The visible surface 14 is flush with the display screen 8 on two lateral edges of the display screen 8, here only on these two said lateral edges.

The visible surface 14 can be flush with the display screen 8 on other edges of the display screen 8. In one alternative, the visible surface 14 is flush with the display screen 8 on the lower edge and/or the upper edge.

In general, the visible surface 14 is flush with the display screen 8 on at least one edge of the display screen 8, in particular exactly one edge, two edges or three edges.

In the illustrated embodiment, the visible surface 14 assumes the form of a substantially horizontal strip in which the display screen 8 is integrated in the first position of the display device 6.

In the first position of the display device 6, the second display zone 12 is hidden by a concealing part 18 of the dashboard 4. The concealing part 18 here is situated behind the display screen 8.

In the second position of the display device, the second display zone 12 is moved relative to the concealing part 18 so as to be visible.

Preferably, the concealing part 18 is an immobile part of the dashboard 4. The concealing part 18 does not move, in particular when the display device 6 is moved between the first stable position and the second stable position.

As illustrated in FIGS. 3 to 5, when the display device 6 moves, the second display zone 12 bypasses the concealing part 18 in order to become visible. The second display zone 12 here passes above the concealing part 18.

The dashboard 4 comprises a housing 20 for receiving the display device 6, the display device 6 being received in the housing 20 when it is in the first stable position and situated at least partially outside the housing 20 when it is in the second stable position.

The housing 20 has an opening 22 through which only the first zone 10 is visible when the display device 6 is in the first stable position. The housing 20 is defined inside the dashboard 4 and emerges outwardly by an opening 22.

In the first position of the display device 6, the first display zone 10 is situated in the opening 22 and is therefore visible, and the second display zone 12 is offset relative to the opening 22 and is therefore not visible.

The opening 22 coincides with the first display zone 10. The opening 22 has dimensions strictly smaller than those of the display screen 8 as a whole, including the first display zone 10 and the second display zone 12.

In the illustrated embodiment, in the first position (FIG. 3), the display device is situated entirely on one side of the opening 22, and in the second position (FIG. 5), the display device 6 extends at least partially on the other side of the opening 22, here completely on the other side of the opening.

As illustrated in FIG. 1, the opening 22 has a closed contour. This allows the display device to appear to be completely integrated into the dashboard when it is in the first stable position.

The visible surface 14 defines two lateral edges of the opening 22. The concealing part 18 defines a lower edge of the opening 22. The dashboard 4 comprises a bead defining an upper edge of the opening 22.

In FIGS. 3 to 5, when it moves from the first position to the second position, the display device 6 leaves the housing 20 through the opening 22.

To that end, the display device 6 is mounted on the dashboard 4 so as to move from the first position toward the second position by pivoting to incline the display screen 8 relative to the opening 22, passing through the opening 22 in the inclined position, then pivoting the display screen 8 back to right it at least partially.

Thus, despite the dimensions of the display screen 8 larger than those of the opening 22, the display screen 6 can pass through the opening 22. Such a movement of the display device 6 is called "swing and slide" movement.

In FIG. 4, the display device 6 is shown in the inclined intermediate direction allowing the passage through the opening 22.

The display device 6 is mounted on the dashboard 4 via a movement mechanism configured to perform the swing and slide movement. One embodiment of a movement mechanism 24 is shown in FIG. 6.

The movement mechanism 24 here comprises a first guiding assembly 26 and a second guiding assembly 28 each comprising a slide 26A, 28A secured to one of the dashboard 4 and the display device 6, and a rail 26B, 28B secured to the other among the dashboard 4 and the display device 6, the slide 26A, 28A sliding along the corresponding rail 26B, 28B.

The rails 26B, 28B of the first guiding assembly 26 and the second guiding assembly 28 extend such that the movement of the slides 26A, 28A, along the rails 26B, 28B causes the incline, translation, then straightening of the display device 6, allowing it to pass through the opening 22.

The slides 26A, 28A are shown in dotted lines in a first position corresponding to the inclined intermediate position of the display device 6.

Other movement mechanisms making it possible to perform a swing and slide movement can be considered, for example a movement mechanism comprising rotated connecting rods.

The movement of the display device 6 is controlled manually or by an actuator.

In FIG. 6, an actuator is provided in the form of a jack 30. The jack is arranged to push the display device 6. During the movement caused by the jack 30, the movement mechanism 24 forces the display device 6 to follow the swing and slide movement, and therefore causes the incline, then straightening of the display device 6.

In one embodiment, the display device 6 is configured such that only the first display zone 10 is active when the display device 6 is in the first stable position, the second display zone 12 being inactive, and such that the first display zone and the second display zone are both active when the display device 6 is in the second stable position.

An active display zone generates light and an inactive display zone does not generate light. The second display zone inactive in the first position of the display device 6 makes it possible to save energy.

Furthermore, in one embodiment in which the display screen 8 is touch-sensitive, the detection of an interaction with a user of the screen is deactivated when the display device is in the first position, and is activated when the display device is in the second position.

Thus, the display device is configured with a first display mode with no touch-sensitive function when it is in the first position, and a second interactive display mode with a touch-sensitive function when it is in the second position. This makes it possible to activate the touch-sensitive function of the display screen only when the display device is in an appropriate ergonomic position for the user.

The invention is not limited to the embodiment of FIGS. 1 to 5. Other embodiments may be implemented.

In the embodiment of FIGS. 1 to 5, the first display zone 10 is situated above the second display zone 12. Alternatively, conversely, the first display zone 10 is situated below the second display zone 12.

In another alternative, the separating line between the first display zone 10 and the second display zone 12 is substantially vertical, the first display zone 10 and the second display zone 12 being situated next to one another.

Furthermore, it is possible to provide two second display zones 12 situated on either side of a first display zone 10, with horizontal or vertical separating lines between the display zones.

Thus for example, in one embodiment, the display screen 8 comprises two second display zones 12 situated above and below a first central display zone 10. The trim then comprises two concealing parts 18 each hiding a second display zone 12 in the first position of the display device 6. The concealing parts 18 define an upper edge and a lower edge of the opening 22 of the housing 20.

The invention is not limited to an application to a vehicle dashboard, and more generally applies to vehicle trim.

The invention claimed is:

1. A vehicle trim assembly, comprising a trim and a display device having a display screen with a first display zone and a second display zone, the display device being movable relative to the trim between a first stable position, in which the first display zone is visible and the second display zone is hidden by the trim, and a second stable position, in which the first display zone and the second display zone are both visible, wherein the second stable position is offset relative to the first stable position along a first direction perpendicular to the display screen in the first stable position, the first direction being a direction toward which the display screen is facing.

2. The vehicle trim assembly according to claim 1, wherein, in the first stable position, the display screen is flush with a visible surface of the trim, and in the second stable position, the display screen protrudes relative to the visible surface.

3. The vehicle trim assembly according to claim 2, wherein the visible surface comprises two regions situated on either side of the display screen.

4. The vehicle trim assembly according to claim 1, wherein the second stable position is furthermore offset relative to the first stable position along a second direction perpendicular to the first direction.

5. The vehicle trim assembly according to claim 1, wherein the trim comprises a housing, the display device being received in the housing in the first stable position, and situated outside the housing in the second stable position.

6. The vehicle trim assembly according to claim 5, wherein the housing has an opening, the first display zone coinciding with the opening and being visible through the opening when the display device is in the first stable position.

7. The vehicle trim assembly according to claim 6, wherein the opening has dimensions smaller than those of the display screen, the display device traversing the opening to go from the first stable position to the second stable position.

8. The vehicle trim assembly according to claim 6, wherein the display device is mounted on the trim to move from the first stable position toward the second stable position by pivoting such that the display screen is inclined relative to the opening, passing through the opening, then pivoting to straighten the display screen at least partially.

9. The vehicle trim assembly according to claim 1, wherein the trim comprises an immobile concealing part hiding the second display zone in the first stable position of the display device, the display device moving between the first stable position and the second stable position so as to bypass said concealing part.

10. The vehicle trim assembly according to claim 1, wherein the trim is a dashboard.

11. A vehicle comprising a vehicle trim assembly according to claim 1.

\* \* \* \* \*